(12) United States Patent
Crawford

(10) Patent No.: US 10,683,964 B2
(45) Date of Patent: Jun. 16, 2020

(54) MOUNT

(71) Applicant: Tad E. Crawford, East Sparta, OH (US)

(72) Inventor: Tad E. Crawford, East Sparta, OH (US)

(*) Notice: Subject to any disclaimer, the term of this patent is extended or adjusted under 35 U.S.C. 154(b) by 0 days.

(21) Appl. No.: 16/161,890

(22) Filed: Oct. 16, 2018

(65) Prior Publication Data

US 2019/0113174 A1 Apr. 18, 2019

Related U.S. Application Data

(60) Provisional application No. 62/573,374, filed on Oct. 17, 2017.

(51) Int. Cl.

| | | |
|---|---|---|
| *F16M 13/02* | (2006.01) | |
| *G09B 23/36* | (2006.01) | |
| *B44C 3/12* | (2006.01) | |
| *B44C 5/06* | (2006.01) | |
| *B44C 5/02* | (2006.01) | |

(52) U.S. Cl.
CPC ............... *F16M 13/02* (2013.01); *B44C 3/12* (2013.01); *B44C 5/06* (2013.01); *G09B 23/36* (2013.01); *B44C 5/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,464,440 A * | 8/1984 | Dotzman | ................. | B44C 5/02 428/16 |
| 5,064,725 A * | 11/1991 | Acker | ....................... | B44C 5/02 428/16 |
| 5,779,294 A * | 7/1998 | Magri | .................... | G09B 23/36 248/496 |
| 6,828,035 B1 * | 12/2004 | Goettl | ....................... | B44C 5/02 211/103 |
| 7,207,535 B1 * | 4/2007 | Giuliani | ................ | A01M 31/06 248/216.1 |
| 8,091,852 B2 * | 1/2012 | Vassallo | .................. | A47G 1/162 248/339 |
| 8,517,741 B1 * | 8/2013 | McLean | ................. | G09B 23/36 434/295 |
| 10,242,599 B1 * | 3/2019 | Herron | ....................... | B44C 5/02 |
| 2012/0043442 A1 * | 2/2012 | Heffernon | ............ | F16M 11/041 248/224.8 |
| 2013/0014373 A1 * | 1/2013 | Jordan | .................. | B29C 39/026 29/428 |
| 2014/0209768 A1 * | 7/2014 | Maria | ....................... | B44C 5/02 248/222.14 |
| 2017/0263160 A1 * | 9/2017 | Hose | ...................... | G09B 23/36 |

* cited by examiner

*Primary Examiner* — Monica E Millner
(74) *Attorney, Agent, or Firm* — Sand, Sebolt & Wernow Co., LPA

(57) ABSTRACT

A mount includes a base having a first surface and a second surface defining a ledge and a mount object including a mounting portion. The mounting portion is complementary in shape to the second surface and the ledge. The mount may further include a bracket or support frame. The second surface, ledge and bracket/support frame define a cavity and the mounting portion is complementary in shape to the surfaces that define the cavity. The first surface of the base is adapted to resemble a profile view of a human or animal face and the mount object is a bird wing or bear paw. The mount may further include an accessory fixedly secured to the base.

15 Claims, 11 Drawing Sheets

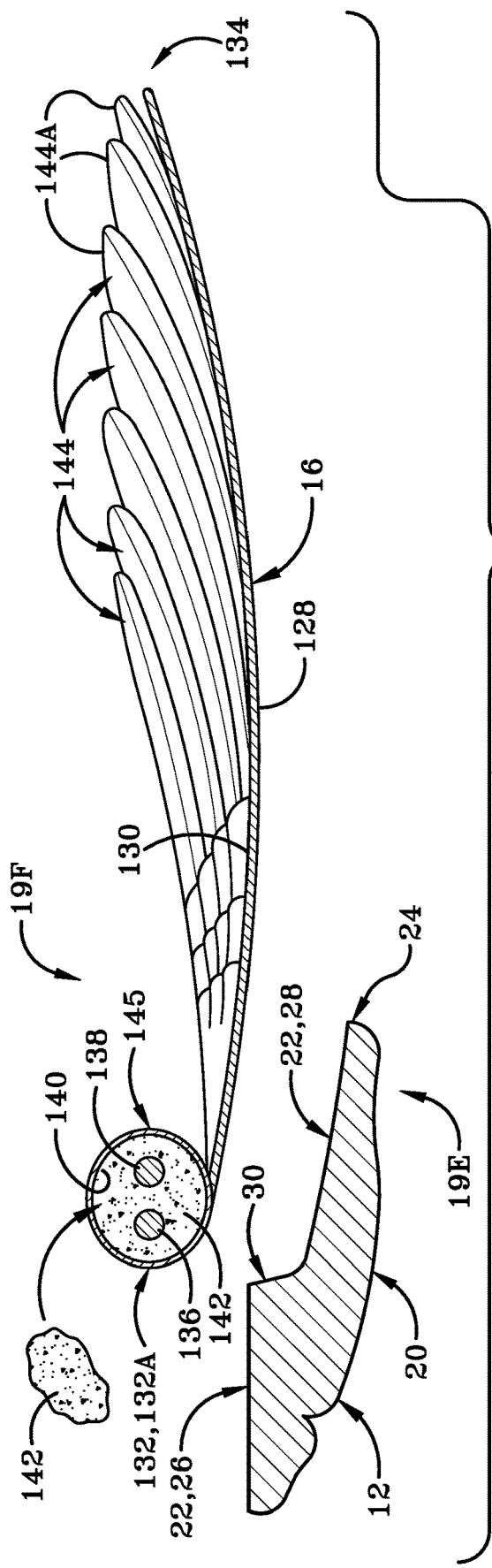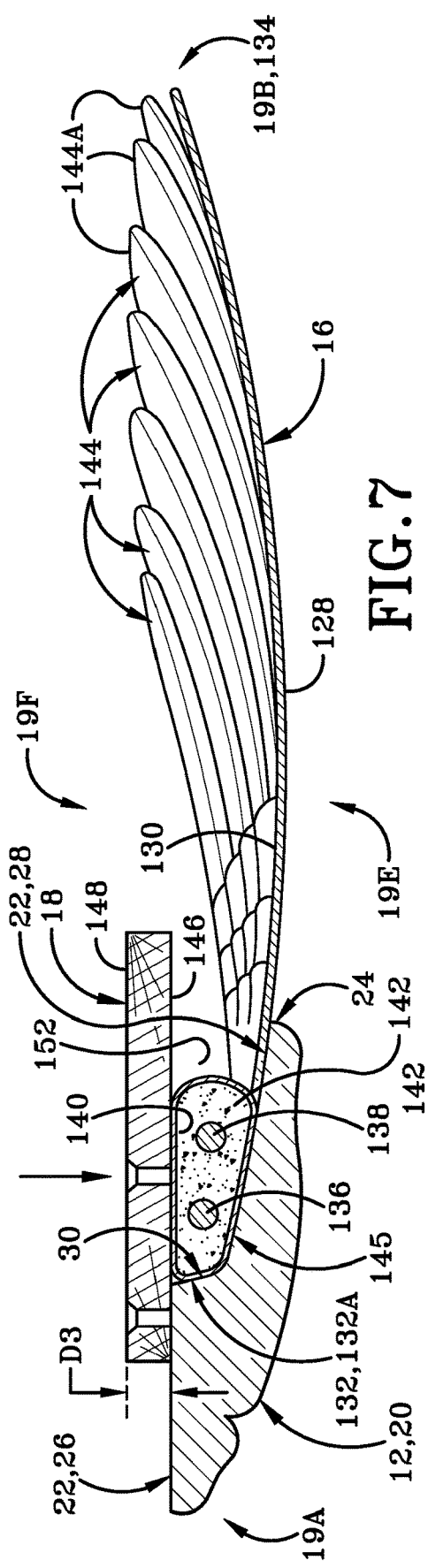

MOUNT

CROSS REFERENCE TO RELATED APPLICATIONS

This application claims the benefit of U.S. Provisional Patent Application Ser. No. 62/573,374, filed Oct. 17, 2017; the entire specification of which is incorporated herein by reference.

BACKGROUND

Technical Field

The present disclosure relates generally to the field of mounting for taxidermy or craft objects. More particularly, the present disclosure relates to a mount including a base and a mount object. Specifically, the present disclosure relates to a mount including a base including a first surface, a second surface defining a ledge and a mount object including a mounting portion where the mounting portion is conformal to the second surface.

Background Information

Generally, craft production is the process of manufacturing by hand with or without the aid of tools. One exemplary form of craft production is taxidermy. Generally, the art of taxidermy includes preserving an animal's body and/or body parts via stuffing or mounting for the purpose of display or study. Animals are often, but not always, portrayed in a life-like state.

The word taxidermy refers to the process of preserving the animal and/or animal body part, but the word is also used to describe the end product, which is typically called a mount where the preserved animal and/or animal body part may be connected with another object. Generally, other forms of craft production also include connecting a mount object with another object. One drawback associated with taxidermy, as well as other types of crafts, is that the mount object does not always connect with the other object in a suitable manner.

SUMMARY

Issues continue to exist with mounting, thus, a need exists for an improved mount including a base and a mount object where the base and the mount object are attached to one another in a complementary manner. The present disclosure addresses these and other issues.

In one aspect, the present disclosure may provide a mount, such as a craft object mount or a taxidermy mount, comprising a base including a first surface, a second surface defining a ledge and a mount object including a mounting portion. The mounting portion is complementary in shape to the second surface. The mount may further include a bracket. The second surface, ledge and bracket define a cavity and the mounting portion is conformal to surfaces defining the cavity. The first surface of the base is adapted to resemble a profile view of a human face and the mount object is a bird wing. The mount may further include an accessory fixedly secured to the base.

In another aspect, the present disclosure may provide a method of forming a mount comprising providing a base including a first surface, a second surface defining a ledge and a mount object including a mounting portion. The method may further include conforming the second surface of the base to the mounting portion and mounting the mount object to the base so that the mounting portion is complementary in shape to the second surface and the ledge.

In another aspect, the present disclosure may provide a mount including a base having a first surface, a second surface defining a ledge and a mount object including a mounting portion. The mounting portion is complementary in shape to the second surface. The mount may further include a bracket. The second surface, ledge and bracket define a cavity and the mounting portion is conformal to the surfaces that define the cavity. The first surface of the base is adapted to resemble a profile view of a bear and the mount object is a bear claw. The mount may further include an accessory fixedly secured to the base.

In accordance with yet another aspect, an exemplary embodiment of the present disclosure may provide a mount for a craft or taxidermy object comprising: a base including a first surface and a second surface defining a ledge that approximates a muscle contour of an animal; and a mount object including a mounting portion that is complementary in shape to the ledge. This exemplary embodiment or another exemplary embodiment may further provide a pocket defined by the mount object filled with a material that defines a contour complementary in shape as the ledge. This exemplary embodiment or another exemplary embodiment may further provide wherein the material within pocket includes a first liquid or semi-solid state and a subsequent second solid state, wherein the material transitions from the first state to the second state to define the contour of the pocket that is complementary to the ledge. This exemplary embodiment or another exemplary embodiment may further provide wherein the material is one of a paper mache and a resin. This exemplary embodiment or another exemplary embodiment may further provide wherein the pocket is formed from a folded portion of the mount object that is sealed at an end. This exemplary embodiment or another exemplary embodiment may further provide wherein the mount object is a taxidermy-preserved wing of a bird and the pocket is formed from skin surround a bone in the wing. This exemplary embodiment or another exemplary embodiment may further provide a first end of the mount object, wherein the first end defines a portion of the pocket. This exemplary embodiment or another exemplary embodiment may further provide a convexly curved portion of the ledge; and a concavely curved portion of the pocket that mateably receives the convexly curved portion of the ledge on the base. This exemplary embodiment or another exemplary embodiment may further provide a first ledge portion extending between first and second ends; a second ledge portion extending between first and second ends; wherein the second end of the first ledge portion is connected with the first end of the second ledge portion. This exemplary embodiment or another exemplary embodiment may further provide wherein the first ledge portion is concavely curved between the first and second ends thereof. This exemplary embodiment or another exemplary embodiment may further provide wherein the second ledge portion is convexly curved between the first and second ends thereof. This exemplary embodiment or another exemplary embodiment may further provide a third ledge portion extending between first and second ends; wherein the second end of the second ledge portion is connected with the first end of the third ledge portion; and wherein the third ledge portion is concavely curved between the first and second ends thereof. This exemplary embodiment or another exemplary embodiment may further provide wherein the second surface of the base is a rear surface of the base; and a rear surface of the skin pocket that is generally coplanar with a portion of the rear surface of the base. This exemplary embodiment or another exemplary embodiment may further provide wherein the second surface of the base is a rear surface of the base that obstructs the skin pocket from view when the mount object is connected to the base and the base is viewed from a front surface thereof. This exemplary embodiment or another exemplary embodiment may further provide a transverse width of the skin pocket that is less than a transverse width of the rear surface of the base. This exemplary embodiment or another exemplary embodiment may further provide a portion of the mount object that extends outwardly beyond a peripheral edge of the base when the skin pocket is behind the rear surface of the base adjacent the ledge. This exemplary embodiment or another exemplary embodiment may further provide wherein the portion of the portion of the mount object that extends outwardly beyond the peripheral edge of the base is one of a feather and a claw. This exemplary embodiment or another exemplary embodiment may further provide a bracket or support frame; wherein the second surface, ledge and bracket or support frame define a cavity and wherein the mounting portion is positioned within the cavity and is complementary to the second surface. This exemplary embodiment or another exemplary embodiment may further provide a profile view of a human face, a profile view of an animal face, and a combination of a human face and an animal face.

In accordance with yet another aspect, an exemplary method or process in accordance with the present disclosure may provide a method of forming a mount for a craft or taxidermy object comprising: providing a base including a first surface and a second surface defining a ledge, wherein the first surface of the base resembles one of a profile view of a human face, a profile view of an animal face, and a combination of a human face and an animal face; providing a mount object including a mounting portion; inserting a material into a pocket of the mounting portion; conforming the mounting portion to the second surface of the base; transitioning the material from a first state to a subsequent solid second state to confirm the pocket to the ledge; and mounting the mount object to the base so that the mounting portion is complementary in shape to a portion of the ledge.

BRIEF DESCRIPTION OF THE SEVERAL VIEWS OF THE DRAWINGS

Sample embodiments of the disclosure are set forth in the following description, are shown in the drawings and are particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 is an exploded cross-sectional view of the base and the mount object.

FIG. 7 is an exploded cross-sectional view of the base, mount object and a bracket.

Similar numbers refer to similar parts throughout the drawings.

DETAILED DESCRIPTION

Figure 1:
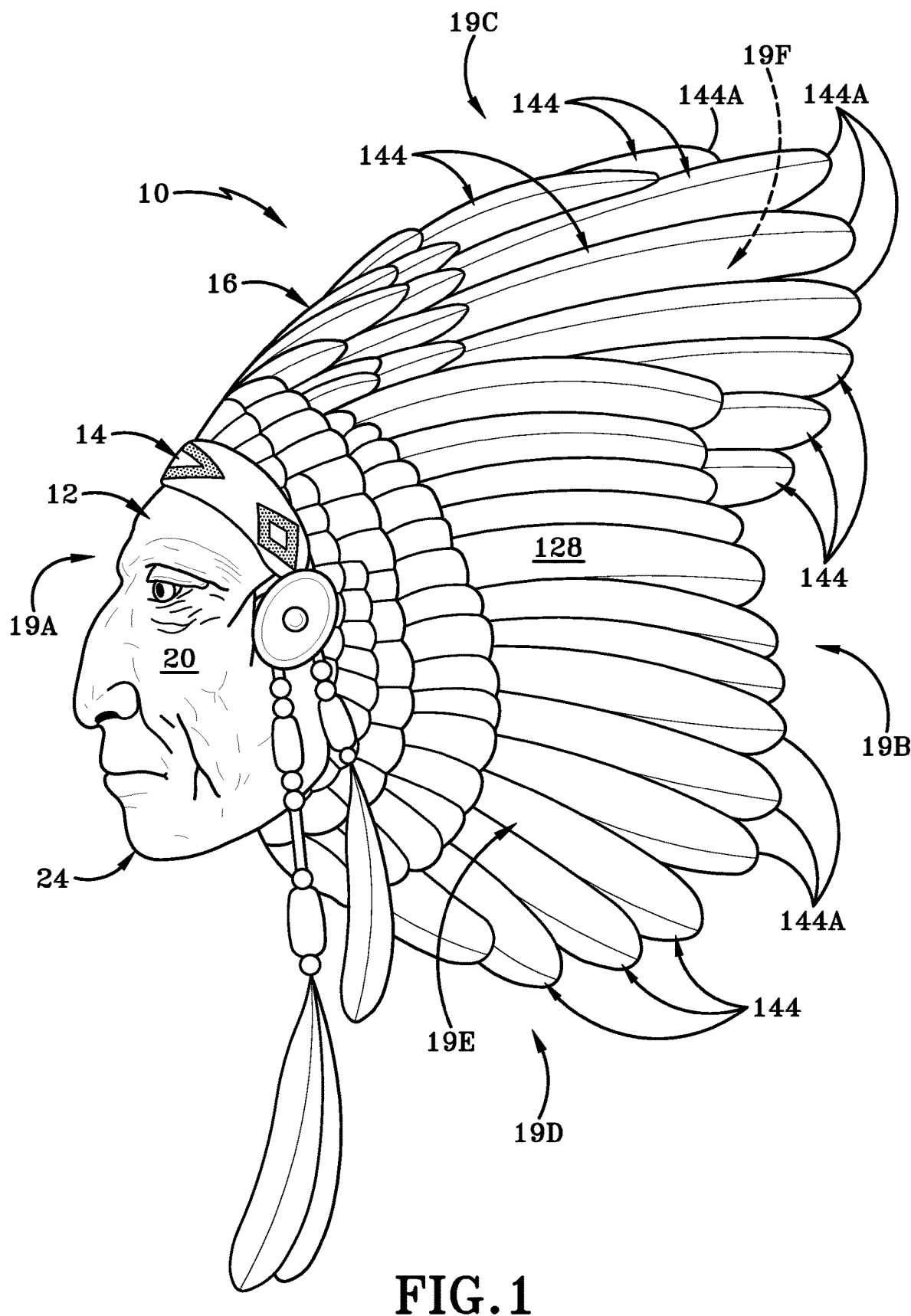
FIG. 1 is a front elevational view of a mount including a base, an accessory and a mount object in accordance with one aspect according to the present disclosure.

In accordance with one aspect of the present disclosure, a mount is provided. As depicted in FIG. 1, the mount is generally indicated by the reference number 10.

The mount 10 may comprise a base 12, an accessory 14, a mount object 16, and a bracket 18. The mount 10 may include a first end 19A and a second end 19B defining a longitudinal direction therebetween, a top 19C and a bottom 19D defining a vertical direction therebetween, and a first side 19E and a second side 19F defining a transverse direction therebetween.

Figure 2A:
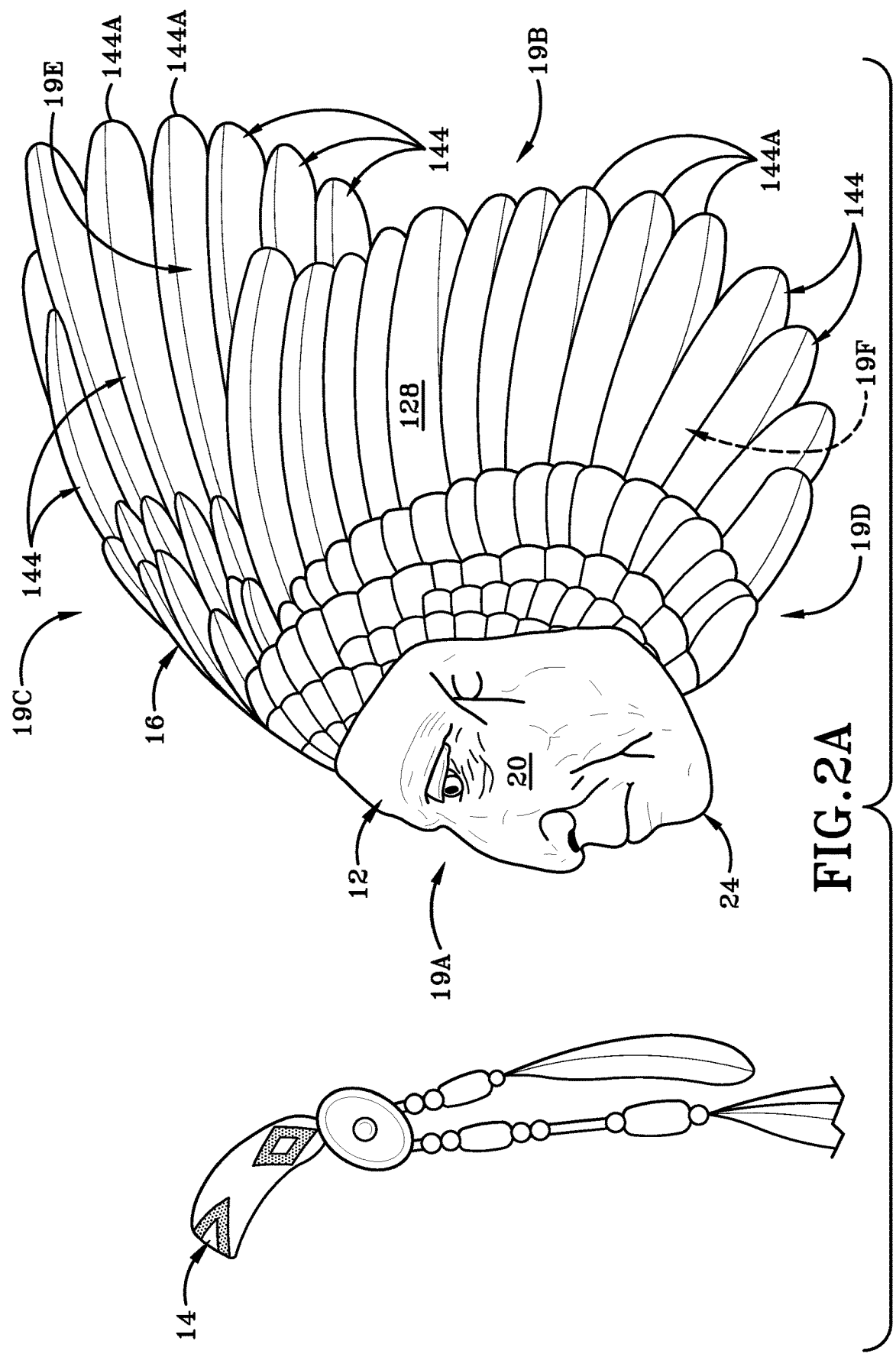
FIG. 2A is a front elevational view of the mount with the accessory removed.
Figure 2B:
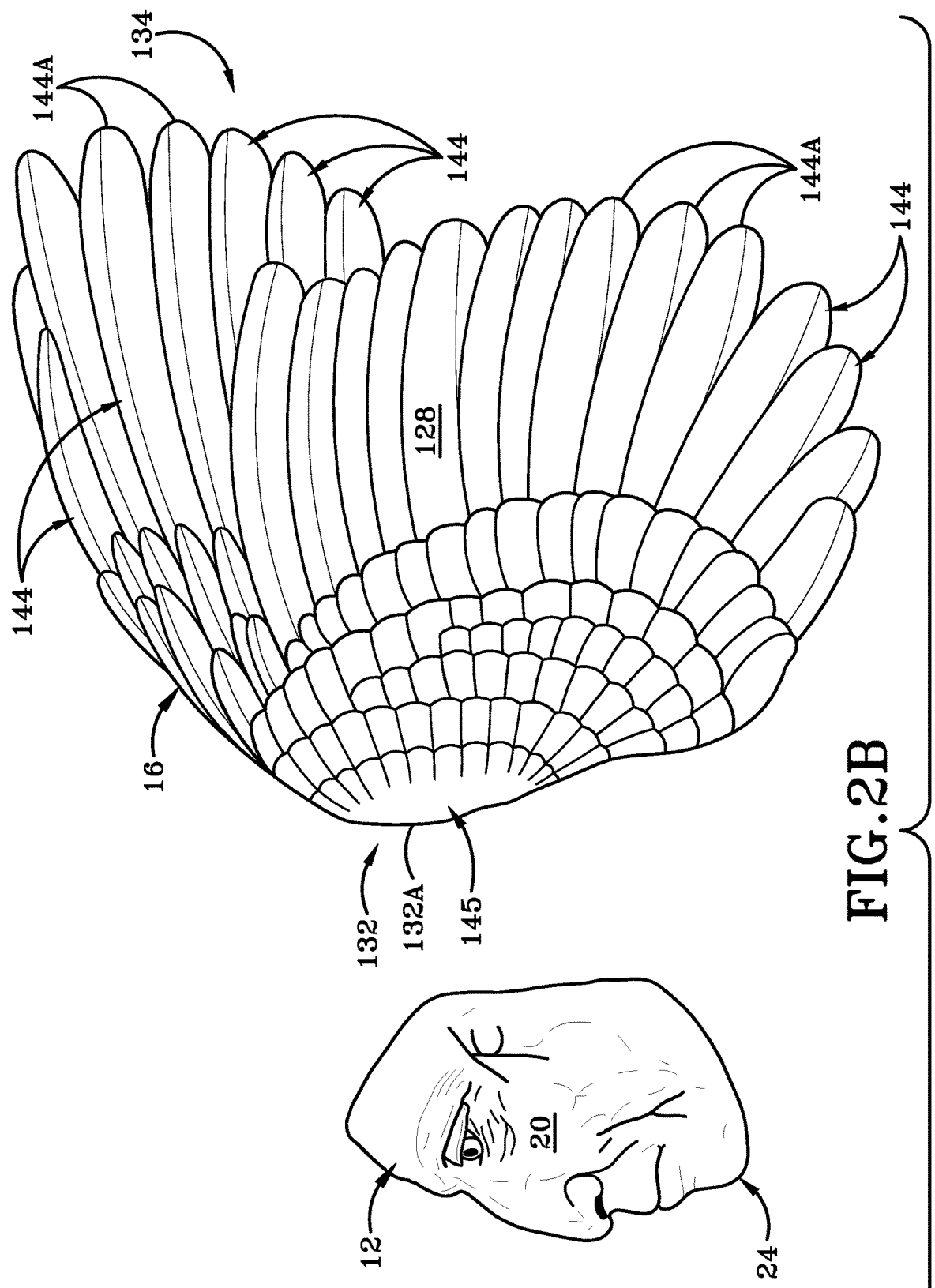
FIG. 2B is an exploded front elevational view of the mount.
Figure 3:
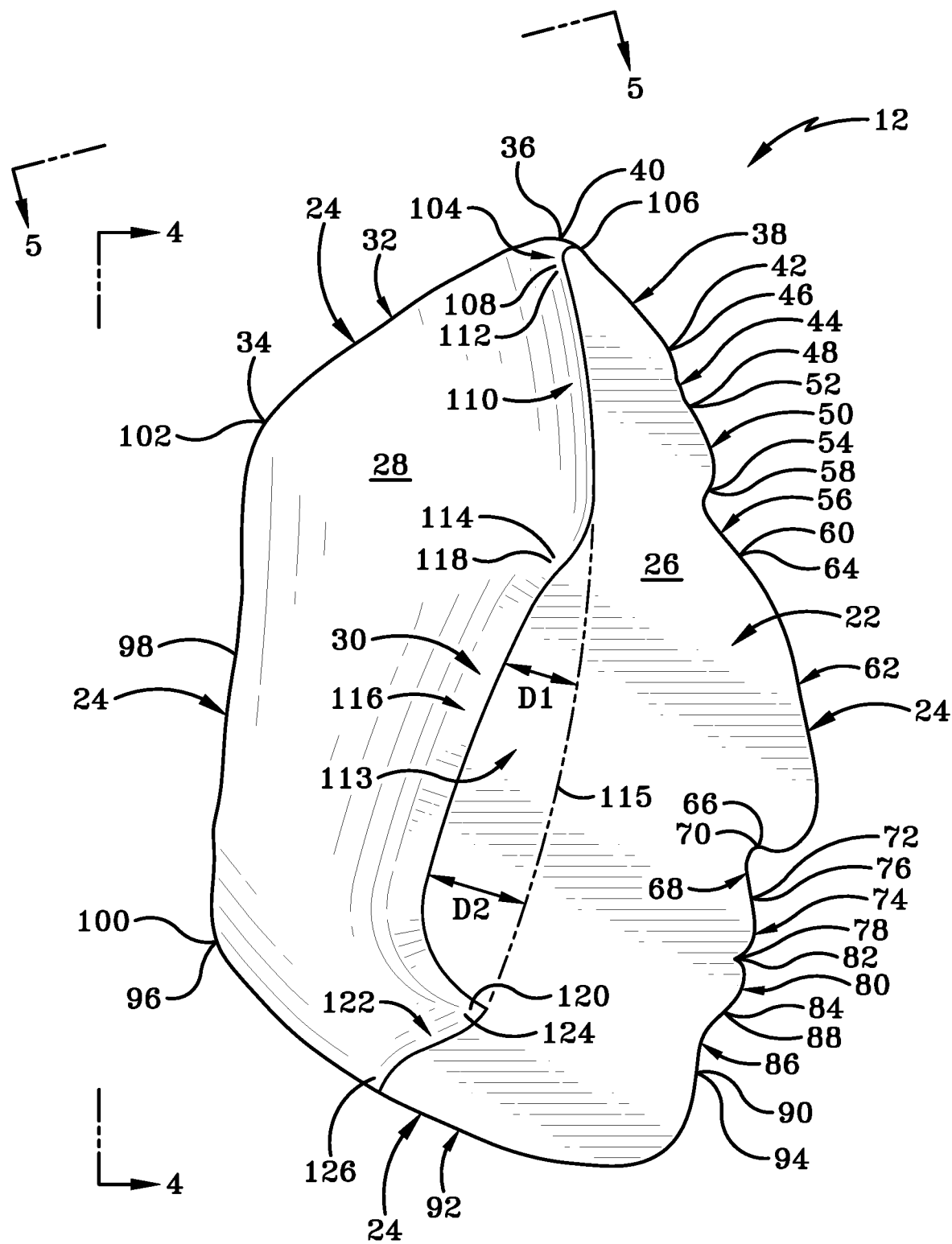
FIG. 3 is a rear elevational view of the base.

As depicted in FIG. 1, FIG. 2B and FIG. 3, the base 12 may include a front surface 20 and an opposite rear surface 22. The front surface 20 may be adapted to resemble a bust or a three-dimensional human face, such as a face resembling that of a person of Native American ethnicity; however, the base 12 may be adapted to resemble any suitable shape and/or object. For example, the base 12 may be formed to resemble the profile of an inanimate object, or the profile of another animal, such as a bear, deer, elk, or other game animal. Alternatively, a human profile could be made that represents a person who has commissioned the work. This would typically be in the case of a hunter who has successfully hunted an animal to be preserved, wherein the profile of the hunter would form the base 12 and a portion of the animal, in a preserved form, would be the mount object 16.

Figure 4:
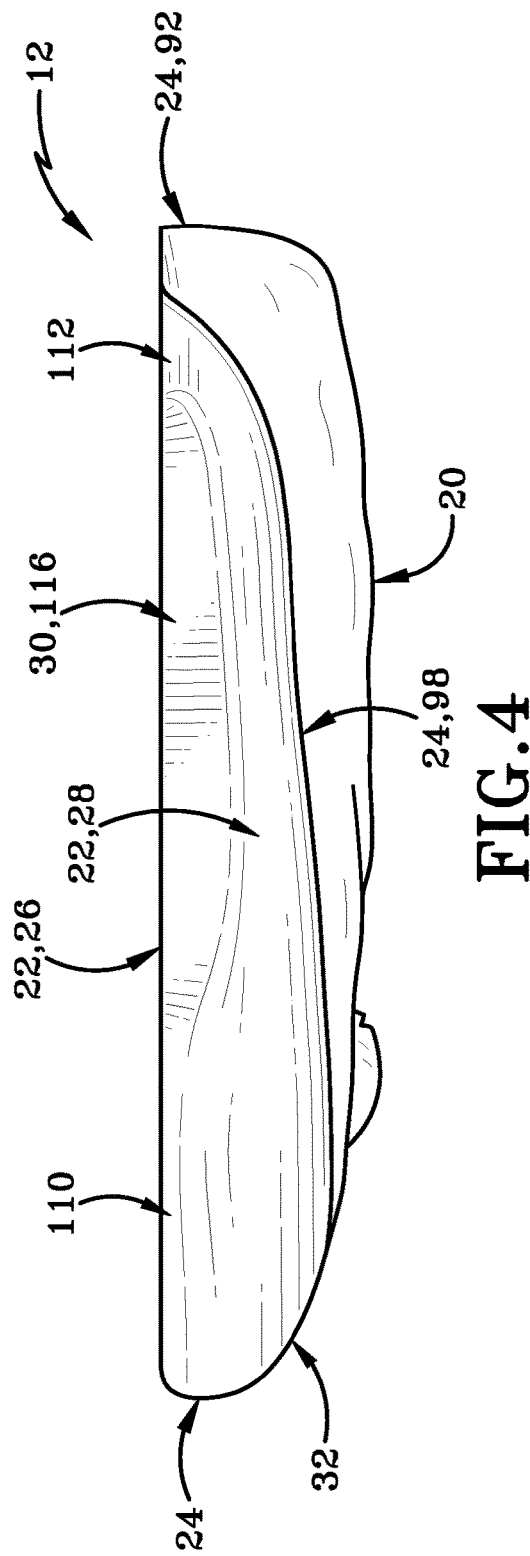
FIG. 4 is a side elevational view taken along line 4-4 1 in FIG. 3.
Figure 5:
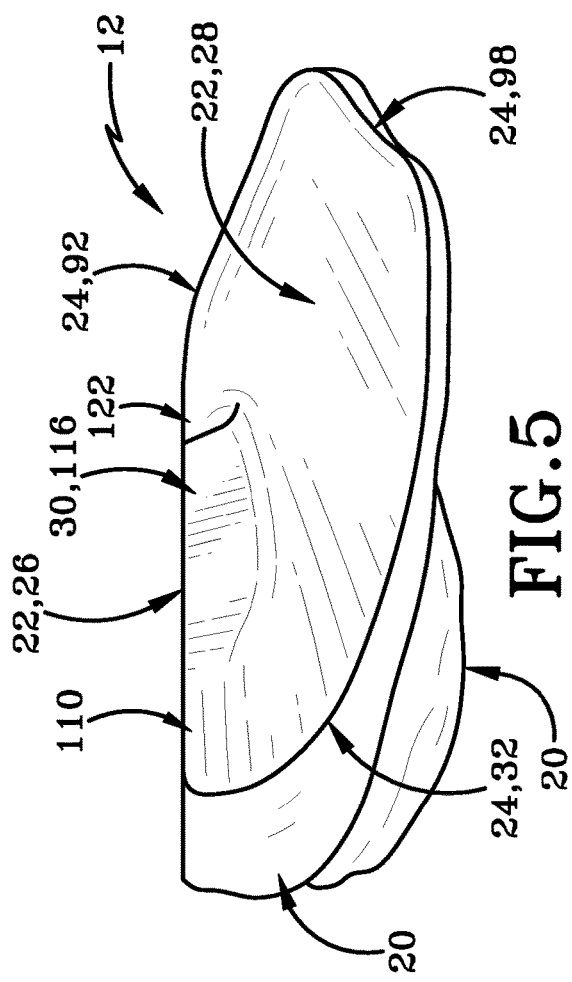
FIG. 5 is a top plan view taken along line 5-5 in FIG. 3.

As shown in FIG. 3-FIG. 5, the rear surface 22 may include an outer peripheral edge 24, a first surface portion 26, a second surface portion 28, and a ledge 30 defined by the second surface portion 28.

The outer peripheral edge 24 may include a first edge portion 32 having a first end 34 and a second end 36. The first edge portion 32 may extend from the first end 34 vertically upwards at an angle towards the second end 36. The angle may be any suitable angle. The first edge portion 32 may be a generally straight edge with rounded corners as shown in FIG. 3.

The outer peripheral edge 24 may further include a second edge portion 38 having a first end 40 and a second end 42. The second edge portion 38 may extend from the first end 40 vertically downwards at an angle towards the second end 42. The angle may be any suitable angle. The second edge portion 38 may be a generally straight edge with rounded corners as shown in FIG. 3.

As shown in FIG. 3, the second end 36 of the first edge portion 32 may be connected to the first end 40 of the second edge portion 38.

The outer peripheral edge 24 may further include a third edge portion 44 having a first end 46 and a second end 48. The third edge portion 44 may extend from the first end 46 vertically downwards at an angle towards the second end 48. The angle may be any suitable angle. The third edge portion 44 may be generally arcuate as shown in FIG. 3.

As shown in FIG. 3, the first end 46 of the third edge portion 44 may be connected to the second end 42 of the second edge portion 38.

The outer peripheral edge 24 may further include a fourth edge portion 50 having a first end 52 and a second end 54. The fourth edge portion 50 may extend from the first end 52 vertically downwards at an angle towards the second end 54. The angle may be any suitable angle. The fourth edge portion 50 may be generally arcuate as shown in FIG. 3.

As shown in FIG. 3, the first end 52 of the fourth edge portion may be connected to the second end 48 of the third edge portion 44.

The outer peripheral edge 24 may further include a fifth edge portion 56 having a first end 58 and a second end 60. The fifth edge portion 56 may extend from the first end 58 vertically downwards at an angle towards the second end 60. The angle may be any suitable angle. The fifth edge portion 50 may be generally arcuate as shown in FIG. 3.

As shown in FIG. 3, the first end 58 of the fifth edge portion 56 may be connected to the second end 54 of the fourth edge portion 50.

The outer peripheral edge 24 may further include a sixth edge portion 62 having a first end 64 and a second end 66. The sixth edge portion 62 may extend from the first end 64 vertically downwards at an angle towards the second end 66. The angle may be any suitable angle. The sixth edge portion 62 may be generally arcuate as shown in FIG. 3.

As shown in FIG. 3, the first end 64 of the sixth edge portion 62 may be connected to the second end 60 of the fifth edge portion 56.

The outer peripheral edge 24 may further include a seventh edge portion 68 having a first end 70 and a second end 72. The seventh edge portion 68 may extend from the first end 70 vertically downwards at an angle towards the second end 72. The angle may be any suitable angle. The seventh edge portion 68 may be generally arcuate as shown in FIG. 3.

As shown in FIG. 3, the first end 70 of the seventh edge portion 68 may be connected to the second end 66 of the sixth edge portion 62.

The outer peripheral edge 24 may further include an eighth edge portion 74 having a first end 76 and a second end 78. The eighth edge portion 74 may extend from the first end 76 vertically downwards at an angle towards the second end 78. The angle may be any suitable angle. The eighth edge portion 74 may be generally arcuate as shown in FIG. 3.

As shown in FIG. 3, the first end 76 of the eighth edge portion 74 may be connected to the second end 72 of the seventh edge portion 68.

The outer peripheral edge 24 may further include a ninth edge portion 80 having a first end 82 and a second end 84.

The ninth edge portion 80 may extend from the first end 82 vertically downwards at an angle towards the second end 84. The angle may be any suitable angle. The ninth edge portion 80 may be generally arcuate as shown in FIG. 3.

As shown in FIG. 3, the first end 82 of the ninth edge portion 80 may be connected to the second end 78 of the eighth edge portion 74.

The outer peripheral edge 24 may further include a tenth edge portion 86 having a first end 88 and a second end 90. The tenth edge portion 86 may extend from the first end 88 vertically downwards at an angle towards the second end 90. The angle may be any suitable angle. The tenth edge portion 86 may be generally arcuate as shown in FIG. 3.

As shown in FIG. 3, the first end 88 of the tenth edge portion 86 may be connected to the second end 84 of the ninth edge portion 80.

The outer peripheral edge 24 may further include an eleventh edge portion 92 having a first end 94 and a second end 96. The eleventh edge portion 92 may extend from the first end 94 vertically downwards at an angle towards the second end 96. The angle may be any suitable angle. The eleventh edge portion 92 may be generally arcuate as shown in FIG. 3.

As shown in FIG. 3, the first end 94 of the eleventh edge portion 92 may be connected to the second end 90 of the tenth edge portion 86.

The outer peripheral edge 24 may further include a twelfth edge portion 98 having a first end 100 and a second end 102. The twelfth edge portion 98 may extend from the first end 100 vertically upwards at an angle towards the second end 102. The angle may be any suitable angle. The twelfth edge portion 98 may be a generally straight edge as shown in FIG. 3.

As shown in FIG. 3, the first end 100 of the twelfth edge portion 98 may be connected to the second end 96 of the eleventh edge portion 92.

As shown in FIG. 3, the first edge portion 32, the second edge portion 38, the third edge portion 44, the fourth edge portion 50, the fifth edge portion 56, the sixth edge portion 62, the seventh edge portion 68, the eighth edge portion 74, the ninth edge portion 80, the tenth edge portion 86 and a portion of the eleventh edge portion 92 may be adapted to resemble a profile view of a human face, such as a profile view of a face of a person of Native American ethnicity.

However, it is to be understood that the second edge portion 38, the third edge portion 44, the fourth edge portion 50, the fifth edge portion 56, the sixth edge portion 62, the seventh edge portion 68, the eighth edge portion 74, the ninth edge portion 80, the tenth edge portion 86 and a portion of the eleventh edge portion 92 may be adapted to resemble any desired object such as by changing the contours of the respective first through eleventh edge portions 38, 44, 50, 56, 62, 74, 80, 86 and 92.

As shown in FIG. 3, the ledge 30 may be defined by the second surface portion 28 of the rear surface 22. The ledge 30 may include a first ledge portion 104 having a first end 106 and a second end 108. The first ledge portion 104 may extend from the first end 106 vertically downwards at an angle towards the second end 108. The angle may be any suitable angle. The first ledge portion 104 may be generally arcuate as shown in FIG. 3. The first end 106 of the first ledge portion 104 may be connected to the outer peripheral edge 24 as shown in FIG. 3.

The ledge 30 may further include a second ledge portion 110 having a first end 112 and a second end 114. The second ledge portion 110 may extend from the first end 112 vertically downwards at an angle towards the second end 114.

The angle may be any suitable angle. The second ledge portion 110 may be generally straight as shown in FIG. 3.

As shown in FIG. 3, the second end 108 of the first ledge portion 104 may be connected to the first end 112 of the second ledge portion 110 as shown in FIG. 3.

The ledge 30 may further include a third ledge portion 116 having a first end 118 and a second end 120. The third ledge portion 116 may extend from the first end 118 vertically downwards at an angle towards the second end 120. The angle may be any suitable angle. The third ledge portion 116 may be generally arcuate as shown in FIG. 3.

As shown in FIG. 3, the second end 114 of the second ledge portion 110 may be connected to the first end 118 of the third ledge portion 116.

The ledge 30 may further include a fourth ledge portion 122 having a first end 124 and a second end 126. The fourth ledge portion 122 may extend from the first end 124 vertically downwards at an angle towards the second end 126. The angle may be any suitable angle. The third ledge portion 116 may be generally arcuate as shown in FIG. 3.

As shown in FIG. 3, the second end 120 of the third ledge portion 116 may be connected to the first end 124 of the fourth ledge portion 122 and the second end 126 of the fourth ledge portion 122 may be connected to the outer peripheral edge 24.

As shown in FIG. 3, the first surface portion 26 of the rear surface 22 may be generally planar and is bounded by the ledge 30 and the second edge portion 38, the third edge portion 44, the fourth edge portion 50, the fifth edge portion 56, the sixth edge portion 62, the seventh edge portion 68, the eighth edge portion 74, the ninth edge portion 80, the tenth edge portion 86 and a portion of the eleventh edge portion 92.

As shown in FIG. 3, the first surface portion 26 may further include a mounting region 113 defined by the third ledge portion 116 and an imaginary curvature line 115 extending between the second ledge portion 110 and the fourth ledge portion 122. As shown in FIG. 3, one portion of the mounting region 113 may extend between the third ledge portion 116 and the imaginary curvature line 115 a distance D1 and another portion of the mounting region 113 may extend between the third ledge portion 116 and the imaginary curvature line a distance D2. In one example, distance D2 may be greater than distance D1; however, distance D1 and distance D2 may be any suitable distances. The mounting region 113 is important inasmuch as it provides the bracket 18 a mounting region for the bracket 18 to be mounted to the base 12 as further described below.

As shown in FIG. 3, the second surface portion 28 may be a generally concave surface and is bounded by the ledge 30, the first edge portion 32, a portion of the eleventh edge portion 92 and the twelfth edge portion 98. The second surface portion 28 extends vertically upwards from the twelfth edge portion 98 towards the first edge portion 32, the ledge 30 and a portion of the eleventh edge portion 92. The second surface portion 28 may be positioned vertically lower than the first surface portion 26. Further, the second surface portion 28 of the rear surface 22 may be adapted to conform to the shape of the mount object 16 as further described below.

In accordance with one aspect of the present disclosure, and as shown in FIG. 1 and FIG. 2A, the accessory 14 may be fixedly secured to the base 12 as further described below. In one example, the accessory 14 may be a headband including various components such as beads, feathers and the like. Although the accessory 14 is depicted as a headband having beads and feathers, it is to be understood that the accessory 14 may be any suitable accessory and may include any suitable decorations. For example, and not meant as a limitation, the accessory 14 may be a spur, a beard, a concho, a tooth, a claw, a shot shell an arrowhead or any other suitable ornamental and/or decorative component.

In accordance with one aspect of the present disclosure, and as shown in shown in FIG. 1, FIG. 2A, FIG. 2B, FIG. 6 and FIG. 7, the mount object 16 may be releasably engaged with the base 12 and the bracket 18 as further described below. In one example, the mount object 16 may be a wing of a bird, such as the wing of a turkey which is also denoted as 16.

Figure 8:
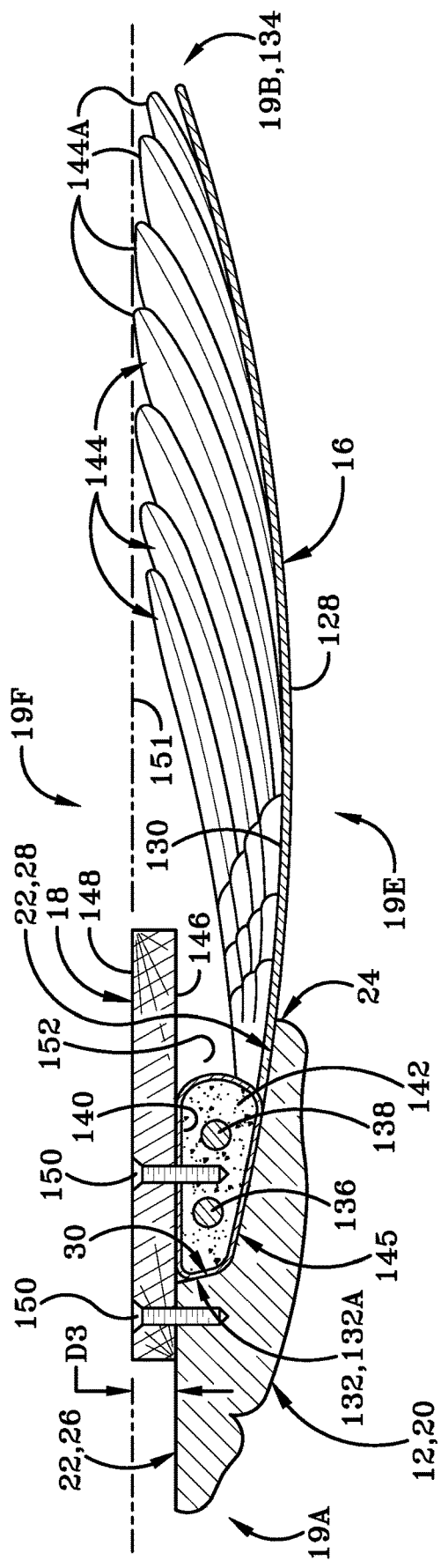
FIG. 8 is an exploded cross-sectional view of the base, mount object and the bracket.

As shown in FIG. 1-FIG. 2B and FIGS. 6-FIG. 8, the mount object 16 may include a front surface 128, a rear surface 130, a first end 132, a second end 134, a radius bone 136, an ulna bone 138, a radius/ulna pocket 140, paper mache or cured resin 142, feathers 144 including outer ends 144A and a mounting portion 145. The feathers 144 extend away from the first end 132 of the mount object 16 towards the second end 134 in a natural curved manner. In one example, the feathers 144 may extend away from the first end 132 of the mount object 16 at an angle $\alpha$ as shown in FIG. 6-FIG. 8. The angle $\alpha$ may be in the range of approximately twenty to twenty-five degrees; however, the angle $\alpha$ may be any suitable angle.

In one example, the ledge 30 including the first ledge portion 104, the second ledge portion 110, the third ledge portion 116 and the fourth ledge portion 116 may be adapted to be complementary in shape to an edge 132A of the first end 132 of the mount object 16. Further, a portion of the mount object 16, such as a portion of the front surface 128 and the first end 132, may be complementary in shape to the second surface portion 28. Although the mount object 16 is depicted as being a turkey wing 16, it is to be understood that the mount object 16 may be any suitable object, including, but not limited to, the wing and/or tail of any suitable bird. Exemplary birds include, but are not limited to, ducks, geese, crows, pheasants and turkeys.

In accordance with one aspect of the present disclosure, and as shown in FIG. 8, the bracket 18 may be releasably engaged with the base 12 and the mount object 16 as further described below. In one example, the bracket 18 may include a front surface 146 and a rear surface 148. The front surface 146 may be spaced apart from the rear surface 148 a distance D3. In one example, the bracket 18 may be made out of wood; however, the bracket may be made out of any suitable material. Further, the distance D3 may be any suitable distance.

In operation, the front surface 20 of the base 12 may be adapted to resemble any desired object, such as a profile view of a human face. In one example, the front surface 20 of the base 12 is adapted to resemble the profile view of a face of a person of Native American ethnicity.

Next, the mount object 16 may be obtained, skinned and prepared for mounting to the base 12 as further described below. In one example, the mount object 16, such as a turkey wing 16 is obtained. The turkey wing 16 may be skinned by inverting the radius and ulna bones through a wing web pocket (not shown) and removing the flesh up to a wrist of the turkey as one of ordinary skill in the art would understand.

Next, a humerus bone may be removed and discarded and the skin of the turkey wing 16 may be severed approximately two inches from an elbow of the turkey as one of ordinary skill in the art would understand. The turkey wing 16 may be preserved in accordance with known taxidermy techniques (e.g. preserved with an injectable preservative).

Next, the feathers 144 may be bent and/or accurately positioned so that they extend away from the first end 132 of the turkey wing 16 towards the second end 134 so that the turkey wing 16 resembles a headdress worn by those of Native American ethnicity.

Next, the radius/ulna pocket 140 may be filled with the paper mache or cured resin 142 in accordance with known taxidermy techniques. Next, the second surface portion 28 and the ledge 30 of the base 12 may be pressed against the mounting portion 145 of the turkey wing 16 so that the mounting portion 145 is complementary in shape to the second surface portion 28 and the ledge 30 of the base 12. Next, the turkey wing 16 may be preened and carded (e.g. feather tracts cleaned and arranged as desired) and dried in accordance with known taxidermy techniques. Inasmuch as pocket 140 may be partially connected to the wing bones, the pocket 140 may be considered to be a folded portion of the mount object that is closed at an end.

Next, the base 12 may be releasably engaged with the mount object 16 and the bracket 18. As shown in FIG. 3, FIG. 7 and FIG. 8, the bracket 18 may be pressed against the first surface portion 26 of the rear surface 22 of the base 12 and the bracket 18 may be affixed to the base 12 with a fastener 150 such as a drywall screw or the like. In one example, the bracket 18 may be placed such that a portion of the front surface 146 of the bracket 18 engages the mounting region 113 of the first surface portion 26 and the fastener 150 extends through the bracket 18 and into the mounting region 113. The mounting region 113 provides a mounting area for the fastener 150. However, the bracket 18 may be fixedly secured to the first surface portion 26 of the rear surface 22 of the base 12 in any suitable manner.

Once the bracket 18 is fixedly secured to the first surface portion 26, the front surface 146 of the bracket 18 and the second surface portion 28 define a cavity 152. Next the mounting portion 145 of the turkey wing 16 may be inserted within the cavity 152 to be fixedly secured to the bracket 18 with a fastener 150. In one example, the fastener 150 extends through the bracket 18 and into the mounting portion 145 of the turkey wing 16; however, the mounting portion 145 may be secured in any suitable manner.

More specifically, and as shown in FIG. 8, the mounting portion 145 which includes the first end 132, the radius/ulna pocket 140 and a portion of the front surface 128 and a portion of the rear surface 130 extend into the cavity 152. As shown in FIG. 8, the turkey wing 16 is complementary to the surfaces of the second surface 28 of the rear surface 22 and the ledge 30 which define the cavity 152.

Specifically, the first end 132 abuts the ledge 30, the radius/ulna pocket 140 abuts the front surface 146 of the bracket 18 and the second surface portion 28 of the rear surface 22. A portion of the front surface 128 of the turkey wing 16 abuts the second surface portion 28 of the rear surface 22. It is to be understood that the surfaces that define the cavity 152 may be adapted to be conformal and/or complementary to the mount object 16 in any suitable manner. It is to be further understood that in one example, the mounting portion 145 may be complementary in shape to the second surface portion 28 while not being complementary in shape to the bracket 18.

Once the bracket 18 is releasably engaged with the radius/ulna pocket 140 and the base 12, the mount 10 may be hung on a wall, a pedestal or the like. In one example, the bracket 18 accommodates the curvature of the feathers 144. In other words, the bracket 18 allows the feathers 144 to bend without coming into contact with a mounting surface 151, such as a wall of the mount 10.

Further, it is to be understood that the abovementioned steps may be completed in a different order than described above. Still further, although the base 12 is depicted as a left profile view of a Native American face and the mount object 16 is depicted as a right turkey wing 16, it is to be understood that the teachings of the present disclosure may be utilized with opposite facing bases 12 and opposite mount objects 16 such as a left turkey wing.

Figure 9:
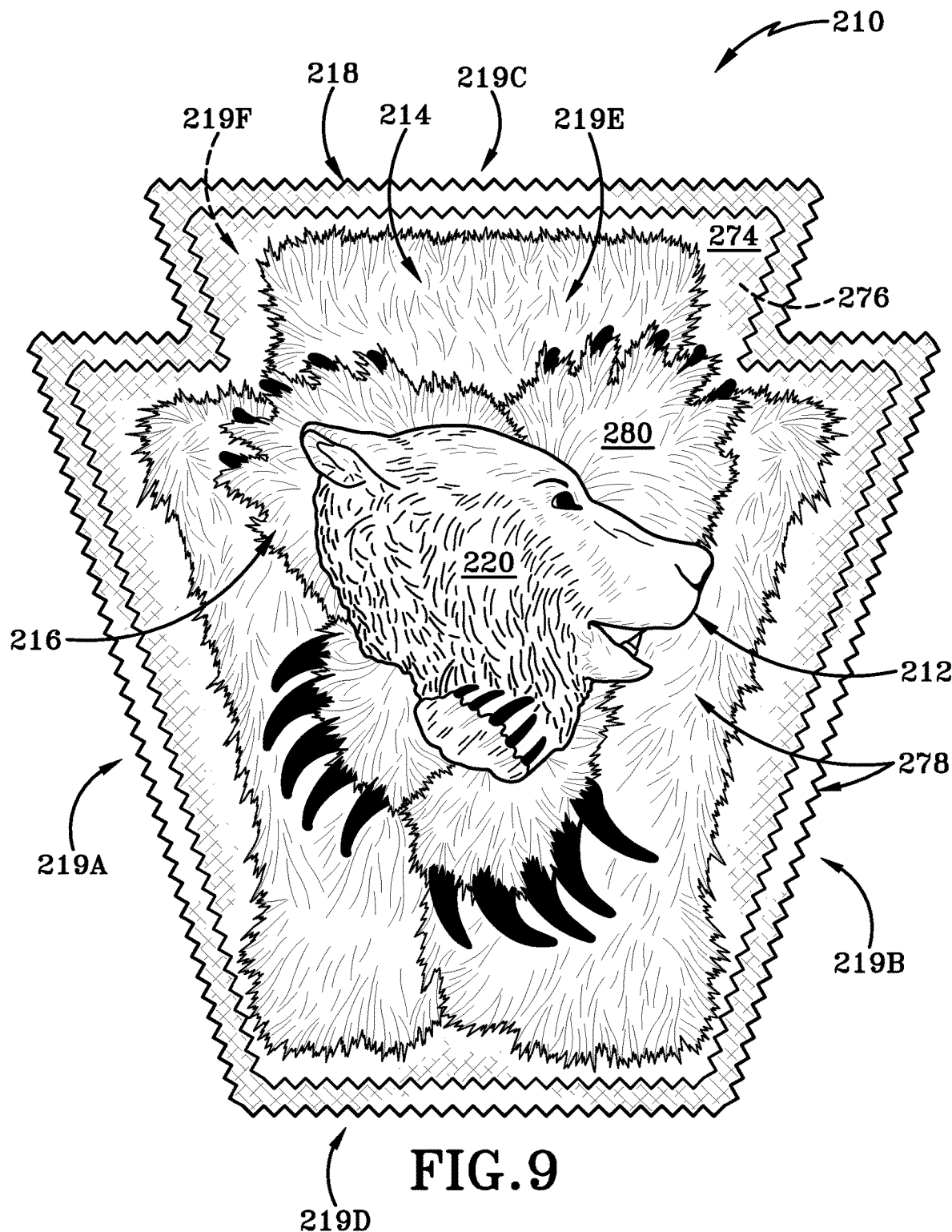
FIG. 9 is a front elevational view of a mount in accordance with a second embodiment that includes a base, decorative accessories, a back board and a mount object.

A second embodiment of the present disclosure is provided. As depicted in FIG. 9, the mount is generally indicated by the reference number 210.

The mount 210 may comprise a base 212, a decorative accessory 214, a planar support 218, and a mount object 216. The mount 210 may include a first end 219A and a second end 219B defining a longitudinal direction therebetween, a top 219C and a bottom 219D defining a vertical direction therebetween, and a first side 219E and a second side 219F defining a transverse direction therebetween.

Figure 10A:
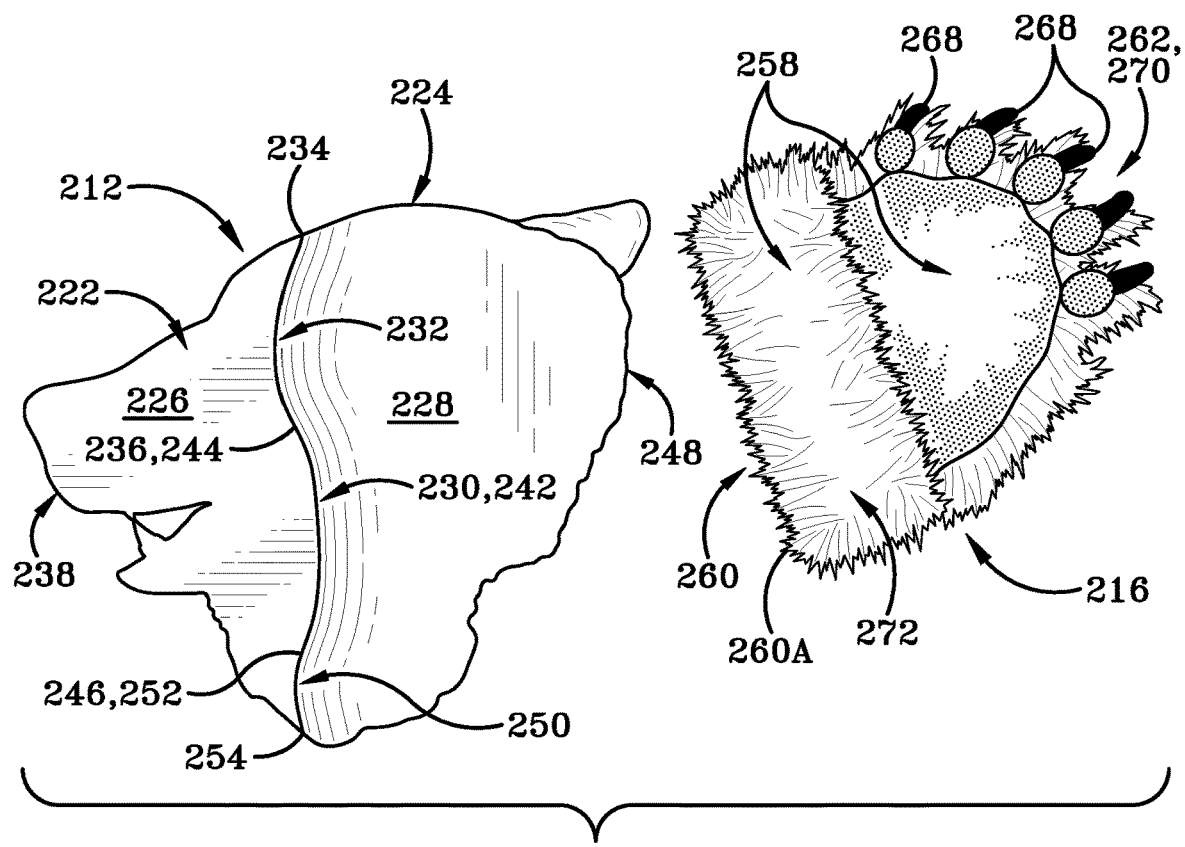
FIG. 10A is an exploded rear elevational view of the base and the mount object of the second embodiment.
Figure 10B:
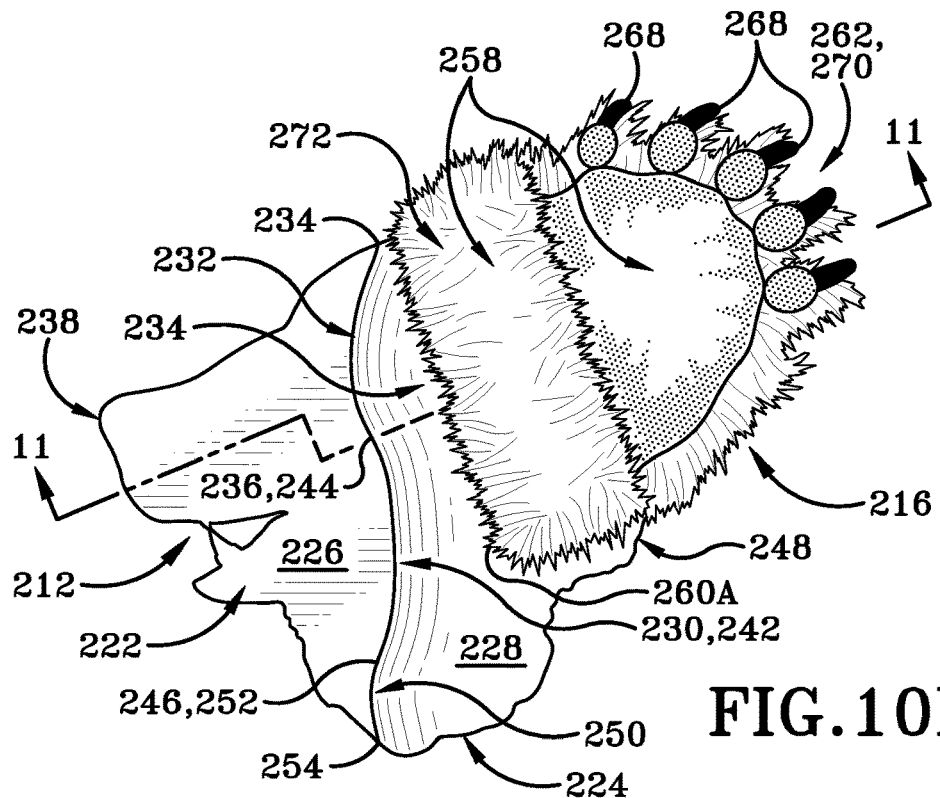
FIG. 10B is a rear elevational view of the base and the mount object of the second embodiment.

As depicted in FIG. 9, FIG. 10A, and FIG. 10B, the base 212 may include a front surface 220 and an opposite rear surface 222. In this embodiment, the front surface 220 has been adapted to resemble a three-dimensional face of a bear.

As shown in FIG. 10A and FIG. 10B, the rear surface 222 may include an outer peripheral edge 224, a first surface 226, a second surface 228, and a ledge 230 defined by the second surface portion 228. In one particular example, the base 212 includes an outer peripheral edge 224 that mimics the shape of a bear's head.

As shown in FIG. 10A, the ledge 230 may be defined by a portion of the second surface 228 of the rear surface 222. The ledge 230 may include a first ledge portion 232 having a first end 234 and a second end 236. The first ledge portion 232 may extend from the first end 234 vertically downward to the second end 236, bowing outward toward the base right edge 238. The first ledge portion may be generally arcuate as shown in FIG. 10A. The first end 234 of the ledge portion 232 may be connected to the outer peripheral edge 224 as seen in FIG. 10A.

The ledge 230 may further include a second ledge portion 242 having a first end 244 and a second end 246. The second ledge portion 242 may extend from the first end 244 vertically downward to the second end 246, bowing outward toward the base left edge 248. The second ledge portion may be generally arcuate as shown in FIG. 10A.

The second end 236 of the first ledge portion 232 may be connected to the first end 244 of the second ledge portion 242.

The ledge 230 may further include a third ledge portion 250 having a first end 252 and a second end 254. The third ledge portion 250 may extend from the first end 252 vertically downward to the second end 254, bowing outward toward the base right edge 238. The third ledge portion may be generally arcuate as shown in FIG. 10A.

As shown in FIG. 10A, the second end 246 of the second ledge portion 242 may be connected to the first end 252 of the third ledge portion 250. The second end 254 of the third edge portion 250 may be connected to the outer peripheral edge 224.

As shown in FIG. 10A, the first surface portion 226 of the rear surface 222 may be generally planar and may be bounded by the ledge 230 and the outer peripheral edge 224 encompassing the face of the bear beginning at the first end 234 of the first ledge portion 232 and extending to the second end 254 of the third ledge portion 250.

As shown in FIG. 10A, the second surface 228 may be a generally concave surface and is bounded by the ledge 230 and the outer peripheral edge 224 encompassing the back of the head of the bear beginning at the first end 234 of the first ledge portion 232 and extending to the second end 254 of the third ledge portion 250. The second surface portion 228 of the rear surface 222 may be positioned vertically lower than the first surface portion 226. Further, the second surface 228 of the rear surface 222 may be adapted to conform to the shape of the mount object 216 as further described below.

In accordance with one aspect of the present disclosure, and as shown in FIG. 9, FIG. 10A, FIG. 10B, and FIG. 11, the mount object 216 may be releasably engaged with the base 212, the decorative accessories 214, and the planar support 218 as further described below. In one example, the mount object 216 may be a paw of an animal, such as a paw of a bear which is also denoted as 216.

Figure 11:
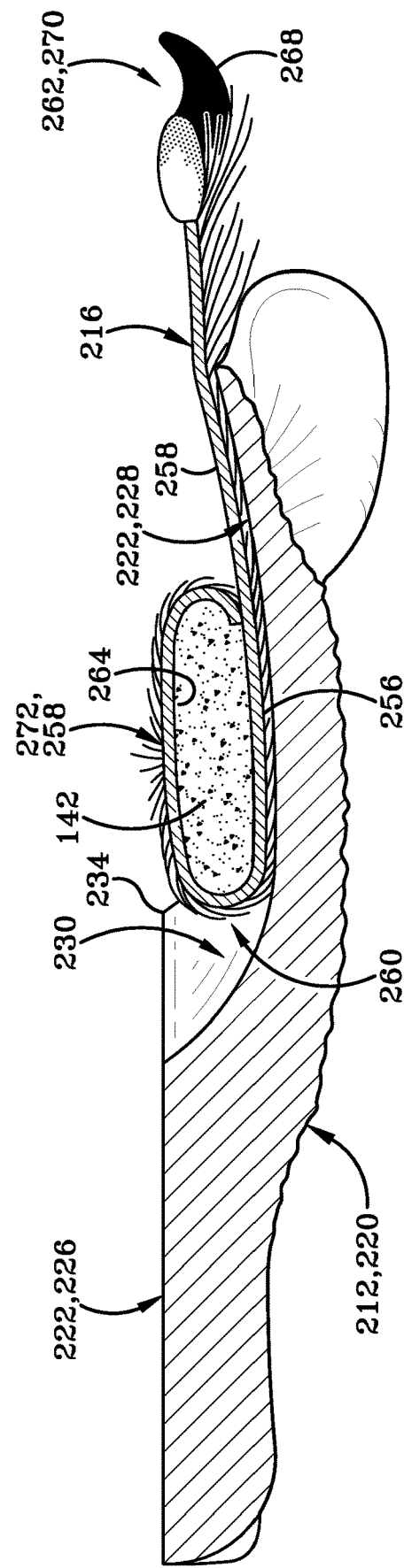
FIG. 11 is an exploded cross-sectional view of the base and mount object along line 11-11 in FIG. 10B.

As shown in FIGS. 9-11, the mount object 216 may include a front surface 256, a rear surface 258, a first end 260, a second end 262, a skin pocket 264, paper mache or cured resin 142, bear claws 268 and a mounting portion 272. The bear claws 268 extend away from the first end 260 of the mount object 216 toward the second end 262.

In one example, the ledge 230 including the first ledge portion 232, the second ledge portion 242 and the third ledge portion 250 may be adapted to be complementary in shape to an edge 260A of the first end 260 of the mount object 216. Further, a portion of the mount object 216, such as a portion of the front surface 256 and the first end 260, may be complementary in shape to the second surface portion 228. Although the mount object 216 is depicted as a bear paw, it is to be understood that the mount object 216 may be any suitable object, including, but not limited to, the paw, hoof, or tail of any suitable animal. Exemplary animals include, but are not limited to, wolves, lions, tigers, and other species of bears. Collectively, ledge 230 approximates or mimics the natural shape, curvature, or contour of a muscle of an animal. Thus, when the paper mache or resin 142 is mateably formed (i.e., press fit) with the ledge 230, the mache or resin 142 forms a complementary shape as the ledge so the base 212 connects with the mount object 216 thereby providing a natural, flush, and uninterrupted appearance.

In accordance with one aspect of the present disclosure, and as shown in FIG. 9, the decorative accessories 214 may be fixedly secured to the base 212 and the mount object 216 as further described below. In one example, the decorative accessories 214 may be animal skin, including various portions of animal extremities and the like. Although the decorative accessories 214 are depicted as bear skin and bear paws, it is to be understood that the decorative accessories 214 may be any suitable decorative accessories. For example, and not meant as a limitation, the decorative accessories may be teeth, claws, rawhide, feathers, a shotgun, or any other suitable ornamental and/or decorative component.

In accordance with one aspect of the present disclosure, and as shown in FIG. 9, the planar support 218 may be releasably engaged with the base 212, the mount object 216, and the decorative accessories 214 as further described below. In one example, the planar support 218 may be a keystone shape and may include a front surface 274 and a rear surface 276. In one example, the planar support 218 may be made out of wood; however, the planar surface may be made out of any suitable material and of any shape.

In operation, the front surface 220 of the base 212 may be adapted to resemble any desired object, such as a profile view of an animal face. In one example, the front surface 220 of the base 212 is adapted to resemble the profile view of a face of a bear.

Next, the mount object 216 may be obtained, skinned and prepared for mounting to the base 212 as further described below. In one example, the mount object 216, such as a bear paw, is obtained. The bear paw may be skinned, leaving the claws attached as one of ordinary skill in the art would understand. The paw may then be preserved in accordance with known taxidermy techniques.

Next, the skin pocket 264 may be created by folding a portion of the animal skin over and connecting an end to an intermediate portion of the animal skin. The folder portion defines and bounds the pocket 264. Pocket 265 may be filled with a moist paper mache or resin. The moist mache or resin 143 is then allowed to cure while being press fit with the back of the base 212 to form a cured mache or resin 142. In one example, the second surface portion 228 and the ledge 230 of the base 212 may be pressed against the mounting portion 272 of the bear paw so that the mounting portion 272 is complementary in shape to the second surface portion 228 and the ledge 230 of the base 212. Next, the claw 268 of the bear paw may be capped to increase the size of the claws in accordance with known taxidermy techniques.

More particularly, the second ledge portion 242 may include a convexly curved surface between first end 244 and second end 246. When forming the mache or resin 142 in a press fit manner, the complementary shape of the mount object 216 along edge 260A forms a concavely curved shape. Similarly, the concave shaped surfaces of the first ledge portion 232 and the third ledge portion 250 are complementary to convexly curved portions of the edge 260A on the mount object 216.

Next, the decorative accessories 214 may be releasably engaged with the planar support 218. As shown in FIG. 9, the decorative accessories 214 may be fixedly secured to the front surface 274 of the planar support 218 in any suitable manner, creating a support frame 278 having a front surface 280.

Next, the base 212 may be releasably engaged with the mount object 216 and the support frame 278. As shown in FIG. 9 and FIG. 10A, the support frame 278 may be pressed against the first surface 226 of the rear surface 222 of the base 212 and the support frame 278 may be affixed to the base 212 with a drywall screw or the like.

Once the support frame 278 is fixedly secured to the first surface portion 226, the front surface 280 of the support frame 278 and the second surface portion 228 of the base 212 define a cavity (not shown). Next, the mounting portion 272 of the bear paw may be inserted within the cavity to be fixedly secured to the support frame 278 with a suitable fastener in any suitable manner.

More specifically, and as shown in FIG. 11, the mounting portion 272 which includes the first end 260, the skin pocket 264 and a portion of the front surface 256 and a portion of the rear surface 258 extend into the cavity created by the front surface 280 of the support frame 278 and the second surface portion 228 of the base 212. As shown in FIG. 11, the bear paw is complementary to the surfaces of the second surface 228 of the rear surface 222 and the ledge 230.

With continued reference to FIG. 11, the rear surface 258 of the pocket 264 is substantially co-planar with the first surface portion 226 of the rear surface 22 of the base 212. This allows the mount object 216 to be positioned behind the base 212 while allowing the base 212 and object 216 to mount flush with a substrate or support, such as the planar support 218.

Furthermore, when the mount 210 is assembled and displayed (as depicted in FIG. 9), the pocket 264 is entirely obstructed from view by the base 212. As shown in FIG. 11, the skin pocket 264 has a transverse width less than that of the second surface portion 228 of the base 212. Accordingly, the skin pocket is positioned behind the second surface portion 228 of the base 212 which obstructs its view when the mount 210 is displayed. However, other portions of the mount object 216 may purposefully extend beyond the peripheral edge of the mount object 216. For example, the claws 268 may be disposed outwardly from the peripheral edge of the mount object so that they are not obstructed from view by the second surface portion 228 of the base 212.

Specifically, the first end 260 abuts the ledge 230, the skin pocket 264 abuts the front surface 280 of the support frame 278 and the second surface 228 of the rear surface 222 of the base 212. A portion of the front surface 256 of the bear paw abuts the second surface 228 of the rear surface 222. It is to be understood that the surfaces that define the cavity may be adapted to be conformal and/or complementary to the mount object 216 in any suitable manner. It is to be further understood that in one example, the mounting portion 272 may be complementary in shape to the second surface portion 228 while not being complementary to the support frame 278.

Once the support frame 278 is releasably engaged with the skin pocket 264 and the base 212, the mount 210 may be hung on a wall, placed on an easel or the like.

Further, as in the first embodiment, it is to be understood that the abovementioned steps may be completed in different order than described above. Still further, although the base 212 is depicted as a left profile view of a bear face and the mount object 216 is depicted as a left front paw, it is to be understood that the teachings of the present disclosure may be utilized with opposite facing bases 212 and opposite mount objects 216 such as a right front paw.

Additionally, it is understood that the present disclosure is not limited to taxidermy. The present disclosure could be expanded to craft projects as well. For example, the base 12 or 212 could be coupled to a mount object 16 or 216 in the form of a dream catcher or other novelty. The mount object 16 or 216 attached to the base 12 or 212 could take any form that is conformal or complementary to a portion of the base 12 or 212.

Figure 12:
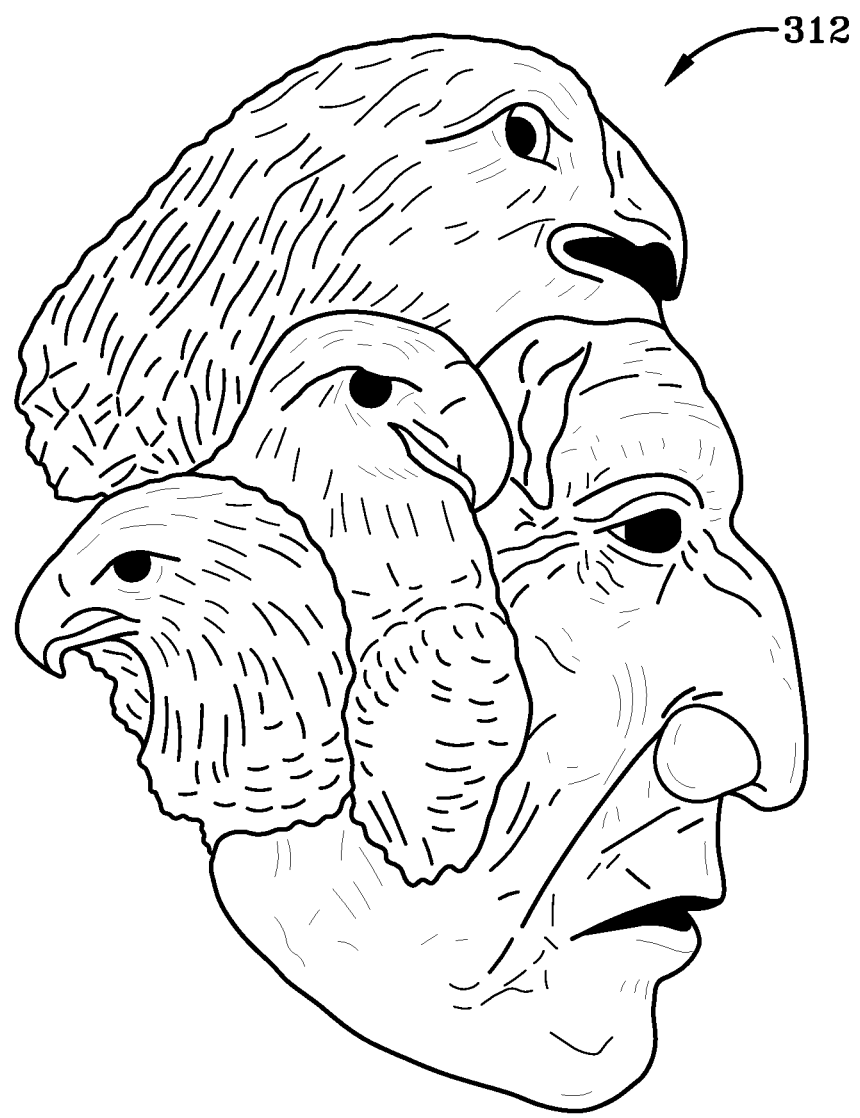
FIG. 12 is a front elevational view of a base in accordance with a third embodiment of the present disclosure.

As shown in FIG. 12, a third embodiment of the present disclosure may include a base 312 that combines human and animal faces. Stated otherwise, as shown via base 12, base 212, or base 312, the first surface of the base resembles one of: a profile view of a human face (i.e., base 12), a profile view of an animal face (i.e., base 212), and a combination of a human face and an animal face (i.e., base 312).

Having thus described various aspects of different mounts with different bases, a method of manufacture of the same is described. A method of forming a mount for a craft or taxidermy object may include providing a base, such as base 12, 212, or 312, including a first surface and a second surface defining a ledge, wherein the first surface of the base resembles one of a profile view of a human face, a profile view of an animal face, and a combination of a human face and an animal face. The based may be prefabricated through a mass manufacture molding process or a one-time mold that may be commissioned by a customer. Once the bases is fabricated, the operator/taxidermist assembling the mount may provide a mount object including a mounting portion. In this instance, the mount object may be the turkey wing or a bear paw. Furthermore, the mounting portion may be the skin pocket. The mounting portion (i.e., skin pocket) may be formed from a portion of the wing that was an existing anatomical component of the bird. However, the mounting portion may be defined by the taxidermist by folding a portion of the skin over itself. Typically, the skin pocket is created so that it has a length that is similar to that of the base. Further, the width of the skin pocket is less than that of the second (i.e., rear) surface of the base.

The paper mache or resin 142 is inserted into the skin pocket that was recently formed. In one particular embodiment, the paper mache or resin is inserted while it is in a first state. More particularly, the first physical state is a liquid or semi-solid. While the mache or resin 142 is in the first state, the taxidermist may press fit the pocket to the ledge on the base 12, 212, or 312. The press fit relationship enable the material (i.e., mache or resin 142) in its first state to conform in a complementary manner to the ledge. Thus, in the regions where the ledge is convex, the pocket filled with the material is concave. And, in regions where the ledge is concave, the pocket filled with material is convex. Similarly, if the ledge is flat/straight, then the pocket is abuttingly flat/straight. The taxidermist then allows the material to transition, such as through the process of curing, from the first state to the subsequent solid second state. When the material hardens to a solid, it retains the conformal or complementary shape of the ledge on the base 12, 212, or 312 that approximates some muscle contour of an animal. After the material is cured, the mount object may be connected with the base. The conformal relationship between the base and the mount object enable the mount to lie flush along a planar support surface. Stated otherwise, the taxidermist may mount the mount object to the base so that the mounting portion (i.e., the skin pocket) is complementary in shape to a portion of the ledge.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A mount for a craft or taxidermy object comprising:
   a base including a first surface and a second surface defining a ledge that approximates a muscle contour of an animal; and
   a mount object including a mounting portion that is complementary in shape to the ledge, a pocket defined by the mount object filled with a material that defines a contour complementary in shape as the ledge;
   a first ledge portion extending between first and second ends;
   a second ledge portion extending between first and second ends; wherein the second end of the first ledge portion is connected with the first end of the second ledge portion;
   wherein the first ledge portion is concavely curved between the first and second ends thereof;
   wherein the second ledge portion is convexly curved between the first and second ends thereof;
   a third ledge portion extending between first and second ends; wherein the second end of the second ledge portion is connected with the first end of the third ledge portion; and
   wherein the third ledge portion is concavely curved between the first and second ends thereof.

2. The mount of claim 1, wherein the material within pocket includes a first liquid or semi-solid state and a subsequent second solid state, wherein the material transitions from the first state to the second state to define the muscle contour of the pocket that is complementary to the ledge.

3. The mount of claim 2, wherein the material is one of a paper mache and a resin.

4. The mount of claim 1, wherein the pocket is formed from a folded portion of the mount object that is closed at an end.

5. The mount of claim 1, wherein the mount object is a taxidermy-preserved wing of a bird and the pocket is formed from skin surrounding a bone in the wing.

6. The mount of claim 1, further comprising:
   a first end of the mount object, wherein the first end defines a portion of the pocket.

7. The mount of claim 1, further comprising:
   a convexly curved portion of the ledge; and
   a concavely curved portion of the pocket that mateably receives the convexly curved portion of the ledge on the base.

8. The mount of claim 1, further comprising:
   wherein the second surface of the base is a rear surface of the base; and
   a rear surface of the pocket that is generally coplanar with a portion of the rear surface of the base.

9. The mount of claim 1, further comprising:
   wherein the second surface of the base is a rear surface of the base that obstructs the pocket from view when the mount object is connected to the base and the base is viewed from a front surface thereof.

10. The mount of claim 9, further comprising:
    a transverse width of the pocket that is less than a transverse width of the rear surface of the base.

11. The mount of claim 10, further comprising:
    a portion of the mount object that extends outwardly beyond a peripheral edge of the base when the pocket is behind the rear surface of the base adjacent the ledge.

12. The mount of claim 11, further comprising:
    wherein the portion of the portion of the mount object that extends outwardly beyond the peripheral edge of the base is one of a feather and a claw.

13. The mount of claim 1, further comprising:
    a bracket or support frame; wherein the second surface, ledge and bracket or support frame define a cavity and wherein the mounting portion is positioned within the cavity and is complementary to the second surface.

14. The mount of claim 1, wherein the first surface of the base resembles one of: a profile view of a human face, a profile view of an animal face, and a combination of a human face and an animal face.

15. A method of forming a mount for a craft or taxidermy object comprising:
    providing a base including a first surface and a second surface defining a ledge, wherein the ledge includes: a first ledge portion extending between first and second ends; a second ledge portion extending between first and second ends; wherein the second end of the first ledge portion is connected with the first end of the second ledge portion; wherein the first ledge portion is concavely curved between the first and second ends thereof; wherein the second ledge portion is convexly curved between the first and second ends thereof; a third ledge portion extending between first and second ends; wherein the second end of the second ledge portion is connected with the first end of the third ledge portion; and wherein the third ledge portion is concavely curved between the first and second ends thereof, wherein the first surface of the base resembles one of a profile view of a human face, a profile view of an animal face, and a combination of a human face and an animal face;
providing a mount object including a mounting portion;
inserting a material into a pocket of the mounting portion;
conforming the mounting portion to the second surface of the base;
transitioning the material from a first state to a subsequent solid second state to confirm the pocket to the ledge; and
mounting the mount object to the base such that the mounting portion is complementary in shape to a portion of the ledge.

\* \* \* \* \*